United States Patent [19]

Dierdorf et al.

[11] Patent Number: 4,672,084

[45] Date of Patent: Jun. 9, 1987

[54] ADHESIVE FOR RIGID PVC

[75] Inventors: Hans-Rolf Dierdorf, Langenfeld; Juergen Wegner, Duesseldorf, both of Fed. Rep. of Germany

[73] Assignee: Henkel Kommanditgesellschaft auf Aktien, Duesseldorf, Fed. Rep. of Germany

[21] Appl. No.: 847,346

[22] Filed: Apr. 2, 1986

[30] Foreign Application Priority Data

Apr. 6, 1985 [DE] Fed. Rep. of Germany ....... 3512537

[51] Int. Cl.$^4$ .......................... C08K 5/15; C08L 27/00
[52] U.S. Cl. .................................... 524/113; 524/527; 156/308.8; 156/314; 156/333; 285/423; 428/515
[58] Field of Search ................ 524/527, 113; 156/333, 156/308.8, 314; 285/423; 428/515

[56] References Cited

U.S. PATENT DOCUMENTS

| | | | |
|---|---|---|---|
| 3,372,219 | 3/1968 | Gord | 524/527 |
| 3,418,274 | 12/1968 | Caplan et al. | 524/527 |
| 3,811,980 | 5/1974 | Roderhoff | 156/333 |
| 4,014,956 | 3/1977 | Smith et al. | 524/527 |
| 4,071,479 | 1/1978 | Broyde et al. | 521/46.5 |
| 4,267,084 | 5/1981 | Mizutani et al. | 524/527 |
| 4,298,714 | 11/1981 | Levin et al. | 525/331.5 |
| 4,567,217 | 1/1986 | Yamazaki et al. | 524/527 |

FOREIGN PATENT DOCUMENTS

| | | | |
|---|---|---|---|
| 1323247 | 2/1963 | France | 156/333 |
| 46-8116 | 3/1971 | Japan | 156/333 |
| 47-44977 | 11/1972 | Japan | 156/333 |
| 60-51736 | 3/1985 | Japan | 524/527 |
| 596108 | 12/1947 | United Kingdom | 156/333 |

Primary Examiner—Joseph L. Schofer
Assistant Examiner—N. Sarofim
Attorney, Agent, or Firm—Ernest G. Szoke; Henry E. Millson, Jr.; Mark A. Greenfield

[57] ABSTRACT

An adhesive composition and a method for its use in bonding rigid PVC elements. The adhesive composition comprises: (1) a first dissolved PVC polymer having a K-value of about 58 ± and a second dissolved PVC polymer having a K-value of about 45 to about 52; (2) at least one cyclic organic solvent; and (3) at least one non-cyclic organic solvent.

30 Claims, No Drawings

_ 4,672,084

ADHESIVE FOR RIGID PVC

BACKGROUND OF THE INVENTION

1. Field of the Invention

This invention relates to an improved adhesive composition for rigid PVC (polyvinylchloride) elements and more especially to a material which, despite a significantly reduced tendency towards stress-induced corrosion, even in critical applications, still satisfies current requirements with regard to storage life, conformity with industrial standards, creep strength, and gap-filling ability.

2. Statement of Related Art

For bonding rigid PVC elements such as molded PVC piping, construction elements, etc., it is common practice to use adhesive compositions which contain powder-form PVC dissolved in a suitable PVC solvent or solvent system. Characteristic application properties of adhesive systems such as these, such as working life and swelling behavior, may be regulated as required through the choice of the solvent mixtures.

The bondingf principle is based on the swelling, dissolving and diffusing powder of the solvents. The solvents diffuse into the underlying material, causing it to swell, and, in conjunction with the PVC introduced in solution, establish the bond when the adherend and substrate are pressed together. The solvents desorb over a period of time which cannot be exactly defined, so that a homogeneous bond is obtained.

Systematic investigations have shown that, because of their dissolving, evaporating and plasticizing properties, the solvents present in adhesives of the type in question have a different effect on possible structural damage arising out of the bonds. This becomes particularly critical when, in the case of heavily stressed moldings such as 4-way pipe fittings, the mechanical load applied is accompanied by additional accumulations of adhesive through displacement of excess adhesive applied between overlaying inner and outer sleeves.

DESCRIPTION OF THE INVENTION

Other than in the operating examples, or where otherwise indicated, all numbers expressing quantities of ingredients, reaction conditions, or defining ingredient parameters used herein are to be understood as modified in all instances by the term "about."

The present invention is based, in part, on the observation that certain solvent components known as good PVC-solvents are responsible for the above-mentioned unwanted structural damage. Tests which were conducted have shown that cyclic PVC-solvents, namely cyclohexanone, and—to a certain extent—tetrahydrofuran, can cause damage, more particularly stress-induced corrosion. Both tetrahydrofuran and cyclohexanone are known as good PVC-solvents, see for example "Kunststoffe 70," (1980), 313 to 318. Their use in adhesive compositions of the type in question here is basically advantageous or even necessary in the light of the various requirements which the adhesive compositions, or rather the rigid PVC bonds ultimately formed, have to satisfy.

Thus, the adhesives in question have to comply with various standard requirements in regard to their creep strength, including DIN (German Industrial Norm) 16,970, KIWA No. 55, BSI 4346, ASTM 2564 and JWWA S 101. The requirements in question control the choice of the PVC-component used in the adhesive in regard to molecular weight and molecular weight distribution. For example, the "60° C. test" in DIN 16,970 demands adequate thermal stability to the PVC material used for the adhesive. This thermal stability depends upon the above-mentioned material parameters.

According to investigations which were conducted, the performance and economic optimum of the PVC used in the adhesive for the PVC-adhesive compositions according to this invention lies at a K-value of 58 ±1 (i.e. 57–59). Furthermore, because of the solution behavior of this PVC-material, this invention requires a solvent composition which necessitates relatively high percentages of the above-mentioned cyclic PVC-solvents for formulating storable, "up-to-standard," gap-filling and creep-resistant adhesives. All attempts to displace the cyclic solvents in favor of non-cyclic solvents by reducing the PVC K-value to below the specified limit were unsuccessful, because at least one of the four criteria just mentioned could not be satisfied by the adhesive composition.

As used herein, the term "K-value" refers to the molecular weights of the polymers, based upon a viscosity measurement. A further explanation of this measurement will be found in the *Encyclopedia of Polymer Science and Technology* (1971) at volume 14, page 517. At page 467 of the same reference, it may be noted that a K-value of 65 for a PVC was stated as equivalent to a number average molecular weight of about 50,000.

The teaching of the present invention is therefore based on the surprising observation that a combination of two PVC-types having different K-values, in combination with cyclic solvents, results in adhesive formulations which conform to required standards and are storable, gap-filling and creep-resistant. At the same time, a significant reduction in the tendency toward stress crazing (as compared with known adhesive compositions of the type currently used) in achieved through a limitation of the content in the solvent mixture of the above-mentioned cyclic PVC solvents.

Accordingly, the present invention affords novel compositions for bonding moldings of rigid PVC based on a PVC solution in a solvent mixture containing cyclic PVC solvents which have PVC solids contents of 10 to 30%, preferably by 20%, by weight. The adhesive compositions are characterized in that they contain one dissolved PVC having a K-value of 58±1 in admixture with another dissolved PVC having a K-value in the range from 45 to 52, preferably 49–50, combined with a content of cyclic PVC solvents in the solvent mixture of up to 50% by weight, based on the weight of the adhesive as a whole.

In another preferred embodiment of the invention, the PVC component having the K-value of 58±1 comprises 40 to 85%, preferably 45 to 60% by weight, of the total weight of the dissolved PVC types, while the other component with the lower K-value comprises the balance to 100% by weight. It can be advisable to dissolve substantially equal quantities by weight of the two PVC types in the solvent mixture.

One particular feature of the invention is that it is now possible to use known effective PVC solvents of cyclic structure, merely by limiting their content in the solvent mixture to achieve the required reduction in stress-induced corrosion. Thus, in one preferred embodiment of the invention, the mixture of PVC solvents contains the cyclic solvents, more especially tetrahydrofuran and/or cyclohexanone, in a total quantity of 30 to 50%, more especially 35 to 45%, by weight, based in each case on the total weight of the adhesive composition.

The remaining components of the liquid phase of the adhesive composition according to the invention comprise non-cyclic PVC solvents, among which non-cyclic ketones are particularly important, especially methylethylketone. In addition to non-cyclic ketones, other non-cyclic PVC-solvents may be used, generally in small quantities, such as dimethyl formamide. The nature of these other non-cyclic PVC solvents is somewhat less critical. A particularly preferred non-cyclic solvent is a mixture of methylethylketone and dimethyl formamide in a weight ratio of about 4–8:1, preferably about 5–7:1.

Particularly preferred adhesive compositions according to the invention contain in total weight: approximately 20% by weight of the two dissolved PVC-components of the types mentioned: 40 to 50% by weight of the cyclic solvents tetrahydrofuran and cyclohexanone, mixed in a weight ratio of 1–2.5:1, 25 to 35% by weight of the non-cyclic solvent methylethylketone; and the balance to 100% by weight of the non-cyclic solvent dimethyl formamide.

The adhesives according to the invention confirm the invention-related observation that the undesirable danger of stress-induced corrosion increases in the following sequence according to the solvent selected for the adhesive system: methylene chloride/dimethyl formamide/methylethylketone/tetrahydrofuran/cyclohexanone. Determination of the comparative figures for assessing the effect of the solvents in initiating stress crazing was carried out in two ways:

a. Determination of the brittleness temperature by impact testing after solvent action The criterion is a 50% failure rate as a function of temperature after 1,000 hours of desorption.

| Polyvinyl chloride | −52° C. (blank test) |
| Methylene chloride | −38° C. |
| Dimethyl formamide | −28° C. |
| Methylethylketone | −21° C. |
| Tetrahydrofuran | +12° C. |
| Cyclohexanone | +22° C. |

B. Peak compressive strength on pipe sections after 168 hours' solvent absorption at −5° C. followed by desorption for 1 hour at +20° C.

The criterion is the failure or cracking rate at 30% compression, based on diameter:

| Polyvinyl chloride | 0% |
| Methylene chloride | 0% |
| Methylethylketone | 20% cracking |
| Tetrohydrofuran | 100% cracking |

EXAMPLES

In formulations 1 to 9 below, No. 1—a comparison example—is a standard commercial PVC-adhesive of the general type under discussion which contains a single basically optimal PVC-component having a K-value of 58 in dissolved form. The following Nos. 2 to 6 are also comparison examples and illustrate the results achieved in reducing the stress crazing level by methods other than the teaching according to the invention. Comparisons 2 to 6 show that in no case can all requirements, including the reduced danger of stress crazing, be satisfied.

Table 1, on the following page, gives the ingredients of the various formulations, and indicates the K-values for all PVC. All percentages are by weight, based upon the weight of the entire formulation.

TABLE 1

| EXAMPLE | PVC #1 K-value | % | PVC #2 K-value | % | Cyclic Solvents (%) Tetra-hydrofuran | Cyclo-hexanone | Non-Cyclic Solvents (%) Methyl-ethylketone | Dimethyl-formamide |
|---|---|---|---|---|---|---|---|---|
| (Comparison) | | | | | | | | |
| 1 (1) | 58 | 20 | — | — | 50 | 20 | 5 | 5 |
| 2 | 56 | 20 | — | — | 40 | 10 | 25 | 5 |
| 3 | 58 | 10 | 50 | 10 | 50 | 20 | 5 | 5 |
| 4(a) | 50 | 20 | — | — | — | — | 80 | — |
| (b) | 58 | 20 | — | — | — | — | 70 | 10 |
| (c) | 63 | 20 | — | — | — | — | —(2) | — |
| 5 | 63 | 10 | 50 | 10 | 40 | 15 | 20 | 5 |
| 6 | 63 | 10 | 46 | 10 | 30 | 15 | 30 | 5 |
| (Invention) | | | | | | | | |
| 7 | 58 | 10 | 50 | 10 | 20 | 20 | 35 | 5 |
| 8 | 58 | 16 | 50 | 4 | 20 | 20 | 35 | 5 |
| 9 | 58 | 10 | 50 | 10 | 35 | 15 | 25 | 5 |

Notes:
(1) a commercial state of the art composition
(2) 80% by weight of methylene chloride was used as the only solvent The eleven formulations of Examples 1–9 were evaluated according to the criteria, given earlier, for a satisfactory adhesive for rigid PVC element, with the results given in Table 2.

TABLE 2

| Example | Formulation Variations from Invention | Results Positive | Negative |
|---|---|---|---|
| 1 | only one PVC more than 50% cyclic solvents | up-to-standard creep resistant gap-filling | danger of stress crazing with a large excess of adhesive |
| 2 | only one PVC K-value too low | reduced danger of stress crazing | not up-to-standard poor thermal stability |
| 3 | more than 50% cyclic | up-to-standard creep resistant gap-filling | risk of stress crazing with a large excess of adhesive |
| 4(a) | only one PVC no cyclic solvents | relatively low risk of stress crazing | not up-to-standard not creep resistant |
| 4(b) | only one PVC no cyclic solvents | | no storage life poor thermal stability |
| 4(c) | only one PVC K-value too high | | |

TABLE 2-continued

| Example | Formulation Variations from Invention | Results Positive | Results Negative |
|---|---|---|---|
| | no cyclic solvents | | |
| 5 | K-value too high (for one PVC) more than 50% cyclic solvents | reduced risk of stress crazing gap-filling | not up-to-standard no storage life |
| 6 | K-value too high (for one PVC) | reduced risk of stress crazing gap-filling | not up-to-standard no storage life poor thermal stability |
| 7 | None | up-to-standard creep resistant gap-filling reduced risk of stress crazing | None |
| 8 | None | As per 7 | None |
| 9 | None | As per 7 | None |

As can readily be seen from Table 2, unacceptable results are obtained when using: only one PVC (Ex. 1, 2, 4); PVC with a K-value too low (Ex. 2); PVC with a K-value too high (Ex. 4(c), 5, 6); more than 50% by weight cyclic solvents (Ex. 1, 3, 5); or no cyclic solvents (Ex. 4). This clearly demonstrates the criticality of the stated criteria of this invention, as well as its unobviousness to one skilled in the relevant adhesives art.

A further technical evaluation of product quality is based on DIN 16,970. German Industrial Norm sets internal pressure creep tests of at least 1000 hours' duration both at room temperature and at 60° C., taking into account a negative gap of −0.2 mm and a positive gap of +0.6 mm. It also stipulates a minimum compressive shear strength of 7 N/mm² at −0.2 mm and 5 N/mm² at +0.6 mm gap.

In the following Table 3, Comparisons 1 to 6 are compared with Examples 7 to 9 according to the invention, with regard to creep strength under internal pressure and compressive shear strength.

TABLE 3

| | Creep tests under internal pressure | | Compressive shear strengths | |
|---|---|---|---|---|
| No. | 51 bar, RT, + .06 mm (hours) | 16 bar, RT, + .06 mm (hours) | −0.2 mm (N/mm²) | +0.6 mm (N/mm²) |
| 1 | >1000 | >1000 | 12.0 | 8.5 |
| 2 | >1000 | <1000 | 11.8 | 8.3 |
| 3 | >1000 | >1000 | 12.1 | 8.7 |
| 4 | <1000 | <1000 | no storage life | |
| 5 | — | — | no storage life | |
| 6 | >1000 | <1000 | no storage life | |
| 7 | >1000 | >1000 | 11.9 | 8.4 |
| 8 | >1000 | >1000 | 11.7 | 8.1 |
| 9 | >1000 | >1000 | 11.5 | 8.2 |

Evaluations of the experimental data showed that prior art Examples No. 4, 5, 6 were not stable for storage and therefore were eliminated for practical use. Prior art Examples 1, 3 produced adhesives which showed good stability values (pressure resistance to shearing, internal pressure-time) but obvious tendencies to rip under pressure. Prior art Example 2 showed the disadvantages of Examples 1, 3 plus additional lack of thermal stability for thermal stability.

Examples 7, 8, 9, all according to this invention, gave acceptable results under all circumstances.

We claim:

1. An additive composition for bonding rigid PVC elements comprising:
   (1) about 10 to about 30% of
      (a) first dissolved PVC polymer having a K-value of about 58±1; and
      (b) second dissolved PVC polymer having a K-value of about 45 to 52;
   (2) not more than 50% of at least one cyclic organic solvent for said polymers; and
   (3) the balance q.s. to 100% of at least one non-cyclic organic solvent for said polymers;
all percentages being by weight and based upon the total weight of said adhesive composition.

2. The composition of claim 1 wherein polymer (a) comprises about 40 to about 85% by weight of ingredient (1).

3. The composition of claim 1 wherein polymer (a) comprises about 45 to about 60% by weight of ingredient (1).

4. The composition of claim 1 wherein polymer (a) comprises about 40 to about 50% by weight of ingredient (1).

5. The composition of claim 1 wherein polymer (a) comprises about 50% by weight of ingredient (1).

6. The composition of claim 1 wherein polymer (b) has a K-value of about 49 to about 50.

7. The composition of claim 2 wherein polymer (b) has a K-value of about 49 to about 50.

8. The composition of claim 3 wherein polymer (b) has a K-value of about 49 to about 50.

9. The composition of claim 5 wherein polymer (b) has a K-value of about 49 to about 50.

10. The composition of claim 1 wherein ingredient (1) is present in about 20% by weight.

11. The composition of claim 7 wherein ingredient (1) is present in about 20% by weight.

12. The composition of claim 8 wherein ingredient (1) is present in about 20% by weight.

13. The composition of claim 9 wherein ingredient (1) is present in about 20% by weight.

14. The composition of claim 1 wherein said cyclic solvent (2) consists essentially of tetrahydrofuran and cyclohexanone, present in a total quantity of from about 30 to about 50% by weight.

15. The composition of claim 11 wherein said cyclic solvent (2) consists essentially of tetrahydrofuran and cyclohexanone, present in a total quantity of from about 30 to about 50% by weight.

16. The composition of claim 12 wherein said cyclic solvent (2) consists essentially of tetrahydrofuran and cyclohexanone, present in a total quantity of from about 30 to about 50% by weight.

17. The composition of claim 13 wherein said cyclic solvent (2) consists essentially of tetrahydrofuran and cyclohexanone, present in a total quantity of from about 30 to about 50% by weight.

18. The composition of claim 14 wherein said cyclic solvent (2) is present in about 35 to about 45% by weight.

19. The composition of claim 1 wherein said cyclic solvent (2) consists essentially of tetrahydrofuran and cyclohexanone, present in a weight ratio of about 1-2.5:1.

20. The composition of claim 1 wherein said cyclic solvent (2) consists essentially of tetrahydrofuran and cyclohexanone in a weight ratio of about 1-2.5:1, and is present in about 35 to about 45% by weight.

21. The composition of claim 11 wherein said cyclic solvent (2) consists essentially of tetrahydrofuran and cyclohexanone in a weight ratio of about 1–2.5:1, and is present in about 35 to about 45% by weight.

22. The composition of claim 12 wherein said cyclic solvent (2) consists essentially of tetrahydrofuran and cyclohexanone in a weight ratio of about 1–2.5:1, and is present in about 35 to about 45% by weight.

23. The composition of claim 13 wherein said cyclic solvent (2) consists essentially of tetrahydrofuran and cyclohexanone in a weight ratio of about 1–2.5:1, and is present in about 35 to about 45% by weight.

24. The composition of claim 1 wherein said non-cyclic solvent (3) comprises a ketone.

25. The composition of claim 1 wherein said non-cyclic solvent (3) comprises: methylethylketone; or a mixture of methylethylketone and dimethyl formamide in a weight ratio of about 4–8:1.

26. The composition of claim 21 wherein said non-cyclic solvent (3) comprises: methylethylketone; or a mixture of methylethylketone and dimethyl formamide in a weight ratio of about 4–8:1.

27. The composition of claim 22 wherein said non-cyclic solvent (3) comprises: methylethylketone; or a mixture of methylethylketone and dimethyl formamide in a weight ratio of about 4–8:1.

28. The composition of claim 23 wherein said non-cyclic solvent (3) comprises: methylethylketone; or a mixture of methylethylketone and dimethyl formamide in a weight ratio of about 4–8:1.

29. An adhesive composition for bonding rigid PVC elements consisting essentially of:
   (1) about 10 to about 30% of
      (a) first dissolved PVC polymer having a K-value of about 58±1; and
      (b) second dissolved PVC polymer having a K-value of about 49 to 50,
   wherein polymer (a) comprises about 40 to about 50% by weight of ingredient 1;
   (2) about 35 to 45% of a cyclic organic solvent consisting essentially of tetrahydrofuran and cyclohexanone present in a weight ratio of 1–2.5:1, and
   (3) the balance q.s. to 100% of a non-cyclic organic solvent consisting essentially of methylethylketone and dimethyl formamide present in a weight ratio of about 4–8:1, all percentages being by weight and based upon the total weight of said adhesive composition.

30. The composition of claim 1, wherein ingredient (2) is present in an amount of at least about 30% by weight.

* * * * *